United States Patent [19]

Seebacher

[11] Patent Number: 4,899,639

[45] Date of Patent: Feb. 13, 1990

[54] REVERSING MECHANISM FOR A SWITCHOVER SEAT-TYPE VALVE

[75] Inventor: Franz Seebacher, Graz, Austria

[73] Assignee: Rohren- und Pumpenwerk Rudolf Bauer Aktiengesellschaft, Steiermark, Austria

[21] Appl. No.: 326,616

[22] Filed: Mar. 21, 1989

[30] Foreign Application Priority Data

Mar. 21, 1988 [AT] Austria ................................. 753/88

[51] Int. Cl.$^4$ ............................................ F15B 13/04
[52] U.S. Cl. .................................... 91/347; 137/625.27
[58] Field of Search ....................... 91/347; 137/625.27

[56] References Cited

U.S. PATENT DOCUMENTS 2,868,177  1/1959  Graybill ........................... 91/347 X Primary Examiner—Gerald A. Michalsky
Attorney, Agent, or Firm—Herbert Dubno

[57] ABSTRACT

A switchover valve has a pair of levers on the valve piston which can be displaced against spring force through deadcenter positions to engage stops on brackets connected to the valve housing and traversed by the levers. A switching member in lost motion connection with a control rod connected to a working piston is articulated to the levers.

16 Claims, 2 Drawing Sheets

REVERSING MECHANISM FOR A SWITCHOVER SEAT-TYPE VALVE

FIELD OF THE INVENTION

My present invention relates to a reversing mechanism for effecting the shifting between oppositely effective positions of the valve member of a reversing or switchover valve of the seat-type and, more particularly, to a switchover or reversing valve which can be used in the control of hydraulic apparatus for reversing or switching over the operating state in response to a working piston or some other actuating force.

BACKGROUND OF THE INVENTION

Switchover or reversing valves are widely used in the control of hydraulic systems and may be responsive to the arrival of a working piston at the end of a working stroke to reverse the fluid flow to the working cylinder and thereby allow the working piston to be displaced into an opposite position.

Such switchover or reversing valves have appropriate ports which can be connected to a source of hydraulic fluid, to a drain or reservoir for the return of the hydraulic fluid and to opposite sides of the working cylinder, for example, and may have valve seats between these ports which are engaged by a hollow valve piston to control the flow of the hydraulic fluid.

The valve piston may, in turn, be displaceable in a valve housing and generally has two extreme positions representing the two states of the valve and the two directions of flow which the valve is capable of generating in the hydraulic system as a whole.

Such valves and the related working piston may be used, for example, in hydraulically controlled apparatus of various kinds. For example, the valve may be used to control a hydraulically actuated log splitter, hydraulic press, compactor or pusher-type conveyor.

In general, these valves have the advantage that upon the development of large hydraulic restoring forces, the hydraulic valve piston may not effectively be shifted in the opposite direction or at least reliably shifted in an opposite direction. As a consequence, the displacement of the valve member from one seat in the direction of another seat may not reliably occur and hence, at least in some cases, the switchover between positions of the valve cannot be ensured.

OBJECTS OF THE INVENTION

It is, therefore, the principal object of the present invention to provide a switchover mechanism for a valve of the type described which will overcome this drawback and ensure a forced displacement of the valve member from the first seat toward the other seat.

Another object of this invention is to provide a reversing or switchover valve which can have a more reliable switchover or reversing function and will not be sensitive to large restoring forces which might prevent switchover of the positions of the valve member.

It is also an object of the invention to provide a switchover valve with a switchover mechanism ensuring a forced lifting of the valve piston from a seat in the valve housing in such manner that the full force of the working cylinder is applied to the valve piston for this purpose, thereby ensuring a reliable switchover.

SUMMARY OF THE INVENTION

These objects and others which will become more readily apparent hereinafter are attained, in accordance with the present invention, in a switchover valve for hydraulic control which comprises:

a valve housing formed with a plurality of ports and annular seats between the ports;

an elongated hollow valve piston axially shiftable in the housing between opposite positions in which the piston respectively engages the seats to switchover flow through the ports;

a pair of levers pivotally connected to an end of the hollow valve piston;

respective abutment brackets affixed to the housing at locations angularly offset about an axis of the hollow valve piston by about 180°, traversed by the respective lever and each formed with two axially spaced stops engageable by the levers;

a shifting member extending generally perpendicularly to the axis and spaced from the end;

means articulatingly connecting ends of the levers remote from the hollow valve piston to the shifting member for displacing the ends of the levers from positions in which the levers engage respective ones of the stops past deadcenter positions into positions in which the levers engage the other ones of the stops;

spring means biasing the ends of the levers toward one another;

a control rod traversing the shifting member axially and connected with a working piston for effecting the switchover of flow; and respective entrainers spaced apart on the rod and respectively engageable with opposite outer surfaces of the shifting member selectively upon axial displacement of the control rod for entraining the shifting member in the corresponding direction of axial displacement, thereby displacing the levers through the deadcenter positions and effecting shifting of the hollow valve piston in the opposite axial direction to switchover the flow.

According to the invention, therefore, at the end of the hollow valve piston, two swingable elements are provided in the form of levers articulated to this piston and are biased by spring forces and engageable with abutments disposed with 180° offset from one another on horizontally extending abutment-forming brackets Each of these brackets can thus have two such abutments or stops spaced apart in the longitudinal direction or the axial direction of displacement of the hollow valve piston for each of the levers.

Each of the levers is operatively connected to a shifting member or stirrup which extends perpendicular to the axis of the piston. Through the latter extends a control rod which is coupled with the working cylinder and through which the full force of the working cylinder can be applied to this control stirrup via entrainers on the control rod which can engage opposite outer faces of the stirrup.

Thus with the forced displacement by the control rod of the stirrup, I can swing the levers between respective end positions in engagement with the abutments or stops and in which the levers are held by the spring force through an intervening deadcenter position.

The full force of the working cylinder thereby displaces the levers and hence the hollow valve piston from one axial extreme position to the other axial extreme position.

According to another feature of the invention, the levers extend through longitudinal slits in the brackets, the stops being formed by the edges of these slits at the ends thereof.

According to another feature of the invention, the spring force applied to the levers is generated by a pair of springs flanking the levers and anchored to the outer or free ends thereof. For this purpose, the free ends of the levers can be traversed by pins which are engaged by the tension springs At its inner end, each lever is connected by a pivot pin directly to the hollow valve piston According to a further feature of the invention, the brackets are of U-cross section and are each connected at one end to the valve housing while the opposite end forms a stop for the control member or stirrup.

The control member or stirrup can be provided with the U-section members in the form of links or levers articulated to the member perpendicular to the axis and to the free ends of the first-mentioned levers.

Finally, the entrainers may be spaced apart by a distance greater than the thickness of the perpendicular member between the surfaces engaged by the entrainer so that a lost motion is established between the perpendicular member and the rod. This allows a free stroke for the control rod (before entrainment of the control member), so that during switchover, only the control member need be accelerated.

BRIEF DESCRIPTION OF THE DRAWING

The above objects, features and advantages of my invention will become more readily apparent from the following description, reference being made to the accompanying drawing in which.

SPECIFIC DESCRIPTION

The valve of the present invention, comprises a valve housing 1 which is formed with ports 1a, 1b, 1c and 1d which can be connected in a hydraulic control circuit, not shown, to a working cylinder 20 having a working piston 21 reciprocatable therewith to operate a load, e.g. in one of the systems previously described.

Figure 1:
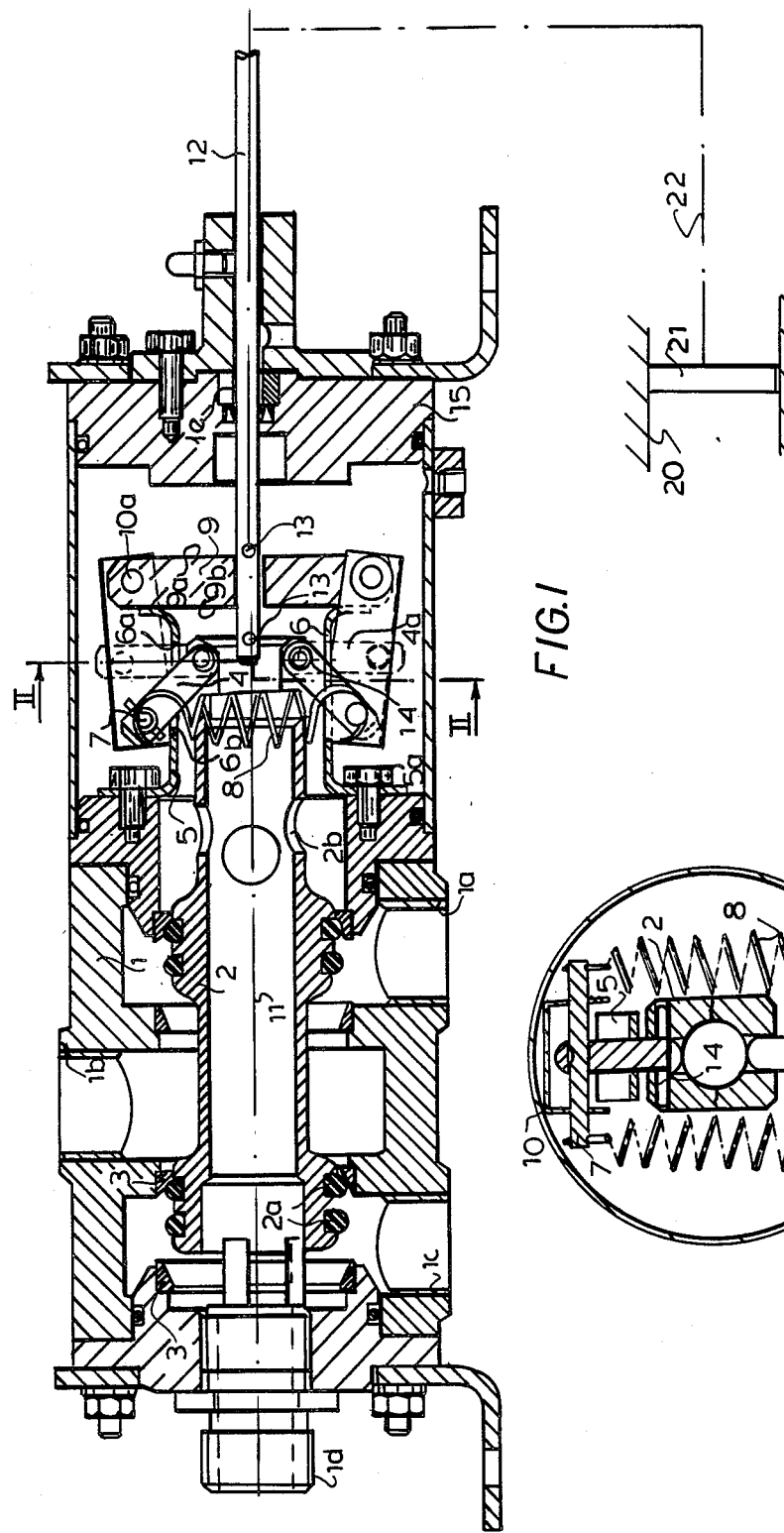
FIG. 1 is an axial section through a switchover valve in accordance with the invention.

Between ports and to control direction of the flow, there are provided seats 3 which are engageable by the seals 2a of a hollow valve piston 2 shiftable along an axis 11 between extreme positions, one of which is shown in FIG. 1, for example.

In this position, the ports 1c and 1d are connected as are the ports 1a and 1b.

In the other extreme position (FIG. 3d), the hollow valve piston 2 connects the ports 1d and 1a (via bores 2b) in the valve piston 2, and ports 1b and 1c. As a consequence, the revering valve of the invention is a 2-4 distributing reversing valve with seats, i.e. a two-position, four-port reversing valve.

To reverse the position of the piston 2 of this valve, the hollow valve piston, according to the invention is provided with a shifting mechanism actuated by a control rod 12 which is slidable in the valve housing along the axis 11 in a seal assembly 1e.

The hollow valve piston 2 at its end turned toward the control rod 12 is connected to a pair of levers 4 by respective pivot pins 14. The levers 4 lying in an axial plane (see FIG. 2) and diverging away from the control rod 12.

Figure 2:
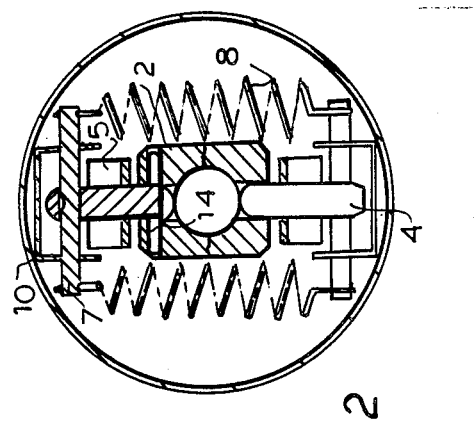
FIG. 2 is a cross-sectional view taken along the line II—II of FIG. 1.

Each of these levers 4 is traversed by a transverse pin 7 (FIGS. 1 and 2) so that the ends of the pins 7 project outwardly beyond the member 2 and form anchors for a pair of tension springs 8 which flank the hollow piston 2 and the levers 4 (see FIG. 2).

The levers 4, at their outer ends are articulated to a control member 9 which extends perpendicularly to the axis 11, is traversed by the control rod 12 with clearance, and forms a stirrup with a pair of links 10 pivotally connected to the levers 4 at the pins 7 and at pins 10a to the control members 9. The links 10 are of U-cross section (see FIG. 2).

The springs 8 lie parallel to one another on opposite sides of the levers.

The levers 4 also pass through longitudinal slits 6 of respective stop brackets which have U-shapes (see FIG. 1) and are fixed at one end by bolts 5a to the valve housing 1. The opposite ends of the brackets 5 form a stop for the leftward movement of member 9 as is best seen in FIG. 1.

As has been noted, the switching member 9 is centrally traversed by the control rod 12 which has a pair of axially spaced pins 13 forming respective entrainers engageable with the surfaces 9a and 9b of the switching member 9, but forming a lost motion connection therewith The control rod 12 is connected via means shown only diagrammatically at 22 with the working piston 21

Figure 3A:
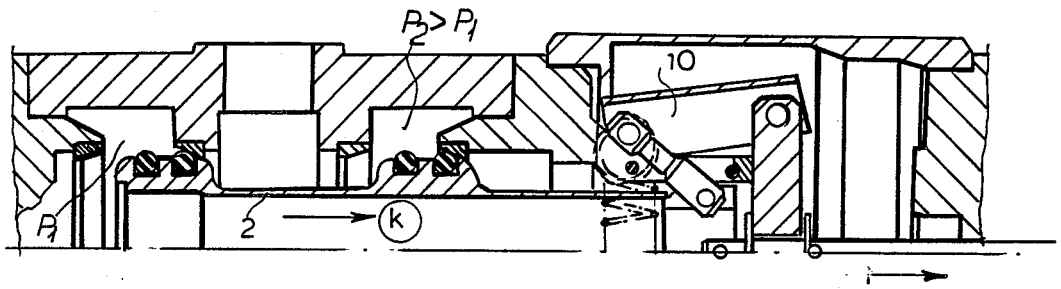
FIGS. 3a–3d are partial axial sections in highly diagrammatic form showing various positions of the parts during a switchover operation.
Figure 3B:
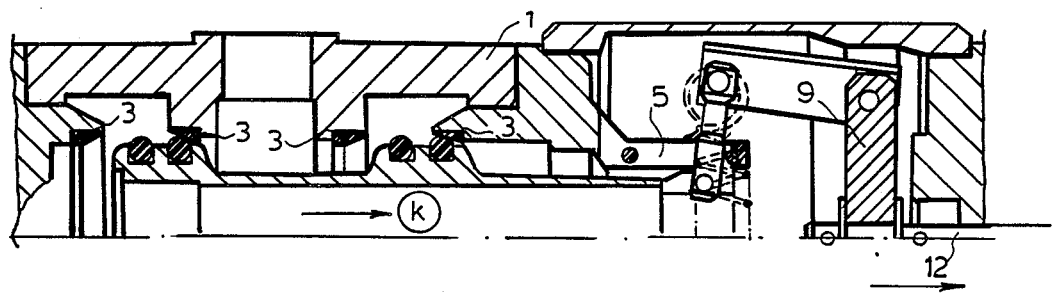

The levers 4 cooperate with stops 6a and 6b formed as the edges at the opposite ends of the slits 6 to maintain either of two bistable positions respectively illustrated in FIGS. 3a–3b. The springs 8 tend to draw the outer ends of the levers 4 together for this purpose.

The deadpoint or deadcenter position of the levers 4 has been shown in dot-dash lines in FIG. 1 at 4a.

Turning to FIGS. 3a–3d, the sequence of operations will be readily apparent. In the position shown in FIG. 3a which corresponds to FIG. 1, fluid communication is permitted between the parts 1a and 1b and between the ports 1c and 1d, the hollow valve piston 2 being in its extreme right position.

Figure 3C:
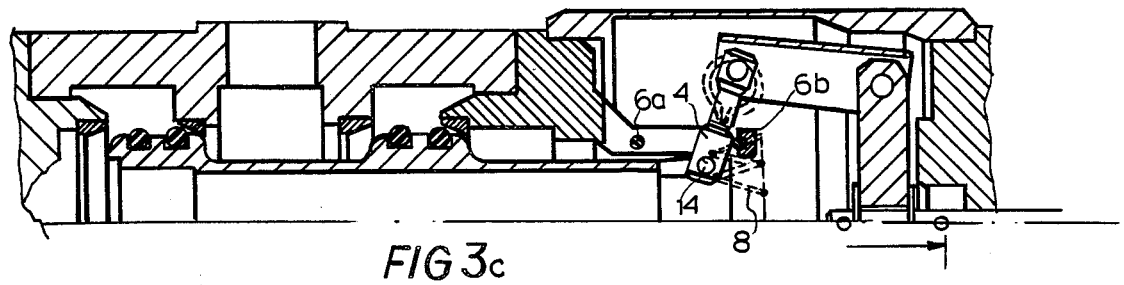
Figure 3D:
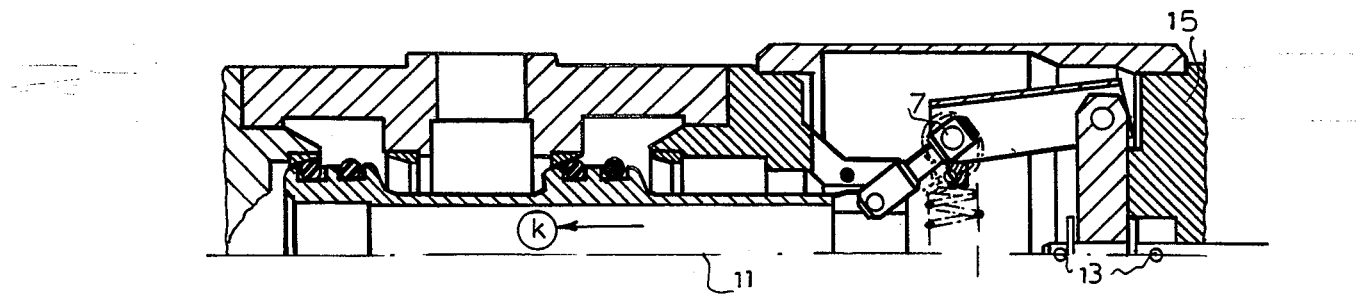

Movement of the rod 12 to the right by the working piston 21, after the lapse of the lost motion period, entrains with the full force of the working piston, the switching member 9 to the right (compare FIGS. 3a and 3b), thereby swinging the levers 4 past their respective deadcenter positions into the position shown in FIG. 3b in which, with the member 9 fully to the right, the levers 4 will fulcrum on the stops 6a and drive the valve piston 2 to the right (see the sequence represented by FIGS. 3b–3d). The spring 8 will maintain the levers in their new extreme position.

The valve member 2 disengages from one set of seats and is forced into engagement with the other set of seats, thereby cutting-off the original hydraulic connection paths and establishing the new connection paths of FIG. 3d, i.e. connecting the ports 1a and 1d and the ports 1b and 1c.

The spring forces ensure, therefore, that the hollow valve piston will be seated against the respective seats with a force contributed by the springs.

The arrow K indicates the direction in which the piston applies its pressing force. Because of the forced removal of the valve member from a prior seat, it is only necessary to accelerate the switching member 9. The hollow valve piston can no longer be retained by hydraulic restoring forces in its original position nor can it be displaced into that original position again until the control rod effects the displacement.

In the position shown in FIG. 3a, different pressures prevail in the switchover valve. Specifically, the pressure in the left-hand chamber may be less than that in the right-hand chamber.

When the hollow valve piston is lifted from the seats, all pressures in the control valve are equal, i.e. no additional hydraulic force is applied to the piston.

As a consequence, the force of springs 8 suffice to effect the displacement of the hollow valve piston against the newly engaged seats and to move the hollow valve piston at the proper speed for this action.

Since, the control rod 12 need no longer be accelerated, the entrainers 13 can be spaced apart to enable a free stroke or lost motion as described. This, of course, ensures a rapid switchover action.

I claim:

1. A switchover valve for hydraulic control, comprising:
   a valve housing formed with a plurality of ports and annular seats between said ports;
   an elongated hollow valve piston axially shiftable in said housing between opposite positions in which said piston respectively engages said seats to switchover flow through said ports;
   a pair of levers pivotally connected to an end of said hollow valve piston;
   respective abutment brackets affixed to said housing at locations angularly offset about an axis of said hollow valve piston by about 180°, traversed by the respective lever and each formed with two axially spaced stops engageable by said levers;
   a shifting member extending generally perpendicularly to said axis and spaced from said end;
   means articulatingly connecting ends of said levers remote from said hollow valve piston to said shifting member for displacing said ends of said levers from positions in which said levers engage respective ones of said stops past deadcenter positions into positions in which said levers engage the other ones of said stops;
   spring means biasing said ends of said levers toward one another;
   a control rod traversing said shifting member axially and connected with a working piston for effecting the switchover of flow; and
   respective entrainers spaced apart on said rod and respectively engageable with opposite outer surfaces of said shifting member selectively upon axial displacement of said control rod for entraining the shifting member in the corresponding direction of axial displacement, thereby displacing said levers through said deadcenter positions and effecting shifting of said hollow valve piston in the opposite axial direction to switchover the flow.

2. The switchover valve defined in claim 1 wherein said brackets are each formed with an axially extending slit traversed by the respective lever and said stops are formed by edges at opposite ends of said slits.

3. The switchover valve defined in claim 1 wherein said spring means includes a pair of tension springs drawing said ends of said levers toward one another and flanking said levers.

4. The switchover valve defined in claim 3 wherein each of said ends of said levers is traversed by a respective pin extending perpendicular to the respective lever, said springs being anchored on said pins.

5. The switchover valve defined in claim 1 wherein each of said levers has an inner end connected to said end of said hollow valve piston by a respective pin.

6. The switchover valve defined in claim 1 wherein each of said brackets has a first end connected to said housing and a second end forming an abutment limiting displacement of said shifting member and engageable thereby.

7. The switchover valve defined in claim 6 wherein said bracket is generally of U-shape.

8. The switchover valve defined in claim 1 wherein said means articulatingly connecting ends of said levers remote from said hollow valve piston to said shifting member include U-section links pivotally connected to said ends of said levers and to said shifting member.

9. The switchover valve defined in claim 1 wherein said entrainers define with said shifting member a lost-motion connection affording a free stroke of said rod so that, for switchover, only said shifting member need be accelerated.

10. The switchover valve defined in claim 9 wherein said means articulatingly connecting ends of said levers remote from said hollow valve piston to said shifting member include U-section links pivotally connected to said ends of said levers and to said shifting member.

11. The switchover valve defined in claim 10 wherein each of said brackets has a first end connected to said housing and a second end forming an abutment limiting displacement of said shifting member and engageable thereby.

12. The switchover valve defined in claim 11 wherein said bracket is generally of U-shape.

13. The switchover valve defined in claim 12 wherein each of said levers has an inner end connected to said end of said hollow valve piston by a respective pin.

14. The switchover valve defined in claim 13 wherein said brackets are each formed with an axially extending slit traversed by the respective lever and said stops are formed by edges at opposite ends of said slits.

15. The switchover valve defined in claim 14 wherein said spring means includes a pair of tension springs drawing said ends of said levers toward one another and flanking said levers.

16. The switchover valve defined in claim 15 wherein each of said ends of said levers is traversed by a respective pin extending perpendicular to the respective lever, said springs being anchored on said pins.

* * * * *